United States Patent
Zhao et al.

(10) Patent No.: US 10,334,240 B2
(45) Date of Patent: Jun. 25, 2019

(54) EFFICIENT AUGMENTED REALITY DISPLAY CALIBRATION

(71) Applicant: DAQRI, LLC, Los Angeles, CA (US)

(72) Inventors: Wenyi Zhao, Mountain View, CA (US); Christopher Broaddus, Santa Clara, CA (US); Aniket Murarka, San Jose, CA (US); Varun Nasery, San Jose, CA (US); Brendan Drew, San Jose, CA (US); Chen-Chi Chu, San Jose, CA (US); Lawrence Gunn, Sunnyvale, CA (US)

(73) Assignee: DAQRI, LLC, Los Angeles, CA (US)

( * ) Notice: Subject to any disclaimer, the term of this patent is extended or adjusted under 35 U.S.C. 154(b) by 333 days.

(21) Appl. No.: 15/338,049

(22) Filed: Oct. 28, 2016

(65) Prior Publication Data

US 2018/0124387 A1 May 3, 2018

(51) Int. Cl.
| | |
|---|---|
| *G02B 27/00* | (2006.01) |
| *G02B 27/01* | (2006.01) |
| *H04N 17/00* | (2006.01) |
| *H04N 13/243* | (2018.01) |
| *H04N 13/246* | (2018.01) |
| *H04N 13/327* | (2018.01) |
| *H04N 13/332* | (2018.01) |
| *H04N 13/344* | (2018.01) |

(52) U.S. Cl.
CPC ....... *H04N 17/002* (2013.01); *G02B 27/0093* (2013.01); *G02B 27/017* (2013.01); *H04N 13/243* (2018.05); *H04N 13/246* (2018.05); *H04N 13/327* (2018.05); *H04N 13/332* (2018.05); *H04N 13/344* (2018.05); *G02B 2027/014* (2013.01); *G02B 2027/0138* (2013.01)

(58) Field of Classification Search
None
See application file for complete search history.

(56) References Cited

U.S. PATENT DOCUMENTS

2017/0045736 A1* 2/2017 Fu ................... G02B 27/0093

OTHER PUBLICATIONS

Ahmet Kermen, Tarkan Aydin, Ali Ozer Ercan, Tanju Erdem, "A Multi-Sensor Integrated Head-Mounted Display Setup for Augmented Reality Applications", Jul. 8-10, 2015, 3DTV-Conference: The True Vision—Capture, Transmission and Display of 3D Video (3DTV-CON) (Year: 2015).*

(Continued)

*Primary Examiner* — Xiaolan Xu
(74) *Attorney, Agent, or Firm* — Schwegman Lundberg & Woessner, P.A.

(57) ABSTRACT

Techniques of augmented reality device calibration are disclosed. In some example embodiments, a system calibrates a visual inertial navigation (VIN) camera of a head mounted display (HMD) device with at least one eye camera of the HMD device to generate multi-camera calibration parameters, calibrating the at eye camera(s) with a display module of the HMD to generate display calibration parameters, calibrating the IMU with the VIN camera to generate VIN calibration parameters, and calibrating the IMU to the display module using the multi-camera calibration parameters, the display calibration parameters, and the VIN calibration parameters.

17 Claims, 9 Drawing Sheets

(56) References Cited

OTHER PUBLICATIONS

Plopski et al. "Automated Spatial Calibration of HMD Systems with Unconstrained Eye-cameras", Sep. 19-23, 2016, 2016 IEEE International Symposium on Mixed and Augmented Reality (ISMAR) (Year: 2016).*

Ronald Azuma, Gary Bishop, "Improving Static and Dynamic Registration in an Optical See-through HMD", Jul. 24-29, 1994, SIGGRAPH '94 Proceedings of the 21st annual conference on Computer graphics and interactive techniques pp. 197-204 (Year: 1994).*

* cited by examiner

EFFICIENT AUGMENTED REALITY DISPLAY CALIBRATION

TECHNICAL FIELD

The present application relates generally to the technical field of data processing, and, in various embodiments, to methods and systems of calibration of augmented reality devices.

BACKGROUND

Augmented reality is a live, direct or indirect, view of a physical, real-world environment whose elements are augmented by computer-generated content and computer-processed sensory input. Augmented reality devices allow users to observe a real-world view while simultaneously viewing virtual content that may be aligned to items, images, objects, or environments in the field of view of the augmented reality device or user. The virtual content may comprise computer-generated imagery (CGI) that is superimposed on a real-world view via a display of the augmented reality device. In implementing such augmented reality features, augmented reality devices often rely on multiple sensors. If the sensors are not sufficiently calibrated, then the virtual content may appear to be improperly displayed to the user.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

Figure 1:
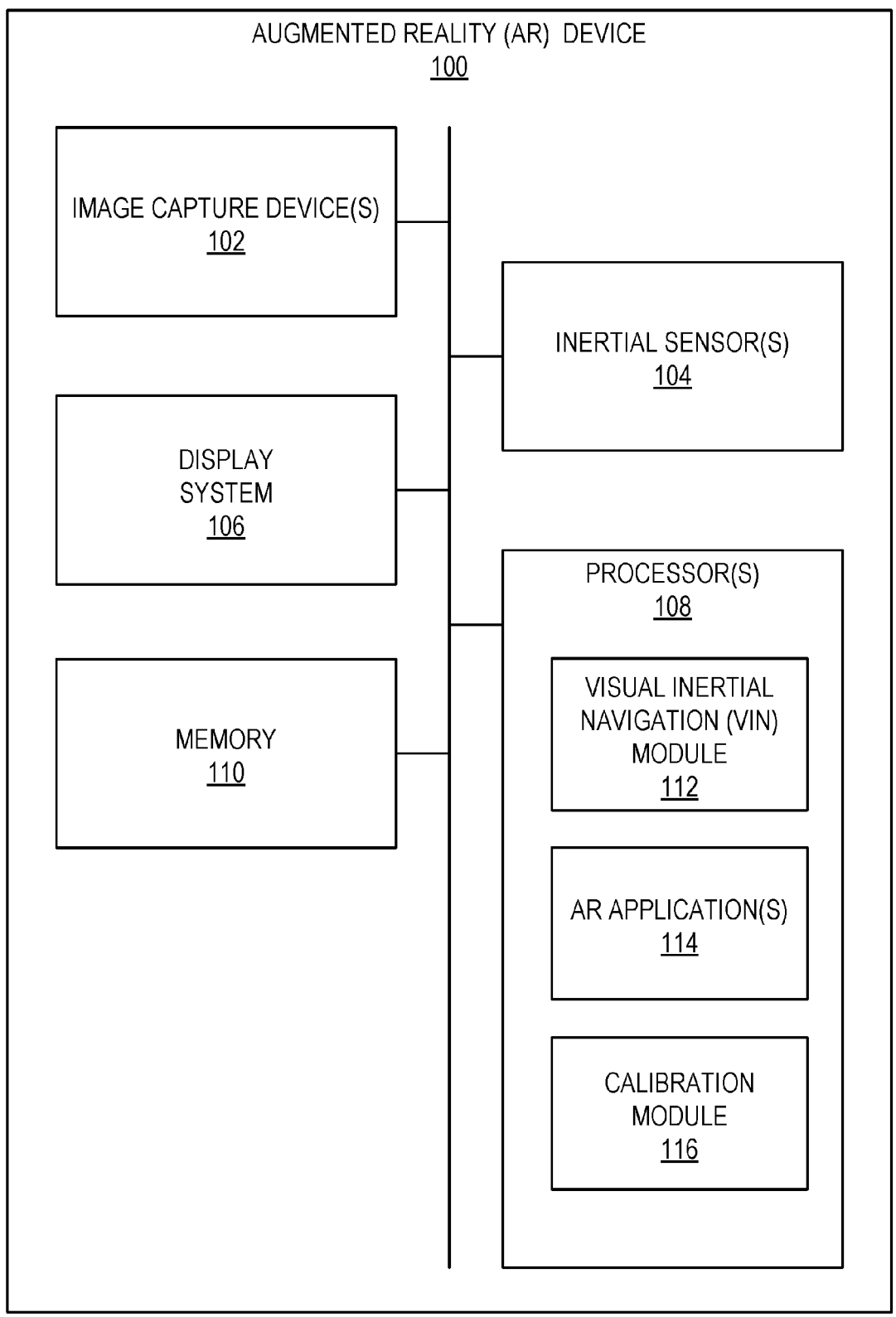
FIG. 1 is a block diagram illustrating an augmented reality (AR) device, in accordance with some example embodiments.

Example methods and systems of augmented reality (AR) display calibration are disclosed. In the following description, for purposes of explanation, numerous specific details are set forth in order to provide a thorough understanding of example embodiments. It will be evident, however, to one skilled in the art that the present embodiments may be practiced without these specific details.

In some example embodiments, a computer-implemented method comprises: calibrating multiple cameras of a head mounted display (HMD) device with respect to one another, the multiple cameras comprising at least one eye camera, the at least one eye camera simulating the positioning of at least one human eye within an interior space of the HMD device looking through a display screen of the HMD device to an exterior space of the HMD, the calibrating of the multiple cameras comprising calculating multi-camera calibration parameters; calibrating the at least one eye camera with a display module of the HMD, the display module being configured to display AR content on the display screen, the calibrating of the at least one eye camera with the display module comprising calculating display calibration parameters; and calibrating, by a machine having a memory and at least one processor, one of a plurality of components of the HMD device with another one of the plurality of components of the HMD device using the multi-camera calibration parameters and the display calibration parameters, the plurality of components comprising the display module and at least one of the multiple cameras.

In some example embodiments, a computer-implemented method comprises: calibrating multiple cameras of a head mounted display (HMD) device with respect to one another, the multiple cameras comprising a visual inertial navigation (VIN) camera and at least one eye camera, the at least one eye camera simulating the positioning of at least one human eye within an interior space of the HMD device looking through a display screen of the HMD device to an exterior space of the HMD, the VIN camera being configured to be used with an inertial measurement unit (IMU) of the HMD device to determine a VIN state, the calibrating of the multiple cameras comprising calculating multi-camera calibration parameters; calibrating the at least one eye camera to a display module of the HMD, the display module being configured to display AR content on the display screen, the calibrating of the at least one eye camera to the display module comprising calculating display calibration parameters; calibrating the IMU to the VIN camera, the calibrating of the IMU to the VIN camera comprising calculating VIN calibration parameters; and calibrating, by a machine having a memory and at least one processor, one of a plurality of components of the HMD device with another one of the plurality of components of the HMD device using a combination of two or more of the multi-camera calibration parameters, the display calibration parameters, and the VIN calibration parameters, the plurality of components comprising the multiple cameras, the display module, and the IMU.

In some example embodiments, a computer-implemented method comprises: calibrating a VIN camera of an HMD device to at least one eye camera of the HMD device, with the at least one eye camera simulating the positioning of at least one human eye within an interior space of the HMD device looking through a display screen of the HMD device to an exterior space of the HMD, the VIN camera being configured to be used with an IMU of the HMD device to determine a VIN state, and the calibrating of the VIN camera to the eye camera(s) comprising calculating multi-camera calibration parameters; calibrating the eye camera(s) to a display module of the HMD, the display module being configured to display AR content on the display screen, the calibrating of the eye camera(s) to the display module comprising calculating display calibration parameters; calibrating the IMU to the VIN camera, the calibrating of the IMU to the VIN camera comprising calculating VIN calibration parameters; and calibrating the IMU to the display module using the multi-camera calibration parameters, the display calibration parameters, and the VIN calibration parameters. In some example embodiments, the HMD device comprises a helmet.

In some example embodiments, the calibrating of the VIN camera to the at least one eye camera comprises receiving VIN data and eye camera data, the VIN data having been captured by the VIN camera and the eye camera data having been captured by the at least one eye camera while the VIN camera, the at least one eye camera, and the HMD device were physically coupled to a calibration robot, and the calculating of the multi-camera calibration parameters comprises calculating the multi-camera calibration parameters using the VIN data and the eye camera data while the HMD device is not physically coupled to the calibration robot. As a result, the time that the HMD device spends on the calibration robot is reduced, thereby leading to significantly greater throughput with respect to the calibration of large numbers of HMD devices.

In some example embodiments, the calibrating of the at least one eye camera to the display module comprises receiving eye camera data, the eye camera data having been captured by the at least one eye camera while the VIN camera, the at least one eye camera, and the HMD device were physically coupled to a calibration robot, and the calculating of the display calibration parameters comprises calculating the display calibration parameters using the eye camera data while the HMD device is not physically coupled to the calibration robot. As a result, the time that the HMD device spends on the calibration robot is reduced, thereby leading to significantly greater throughput with respect to the calibration of large numbers of HMD devices.

In some example embodiments, the calibrating of the IMU to the VIN camera comprises receiving VIN data, the VIN data having been captured by the VIN camera while the VIN camera and the HMD device were physically coupled to a calibration robot, the calculating of the VIN calibration parameters comprising calculating the VIN calibration parameters using the VIN data while the HMD device is not coupled to the calibration robot. As a result, the time that the HMD device spends on the calibration robot is reduced, thereby leading to significantly greater throughput with respect to the calibration of large numbers of HMD devices.

In some example embodiments, the display screen is transparent. In some example embodiments, the display module comprises at least one projector configured to project the AR content onto the display screen.

In some example embodiments, the computer-implemented method further comprises: performing a loop closure process using the HMD device and the VIN calibration parameters; and validating the VIN calibration parameters based on the loop closure process.

In some example embodiments, the computer-implemented method further comprises: performing a loop closure process using the HMD device using the VIN calibration parameters; and validating the VIN calibration parameters based on the loop closure process and ground-truth data provided by a trajectory of a calibration robot.

In some example embodiments, the computer-implemented method further comprises: validating the multi-camera calibration parameters, the display calibration parameters, and the VIN calibration parameters based on design specifications of the HDM device.

In some example embodiments, the computer-implemented method further comprises: validating the multi-camera calibration parameters, after images have been rectified, to verify the straight line connecting a row or column of the grid points or dotted patterns on the calibrated target is still a straight line.

In some example embodiments, the computer-implemented method further comprises providing quality assurance measures to validate the calibration results, for example, if the image re-projection errors for 75% of the detected patterns is within a known threshold based on the design specifications of the HMD device (e.g., a 0.5 pixel threshold for a 640 by 480 image size).

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

In some example embodiments, an AR device comprises a computing device capable of generating a display of a virtual content layered on an image or view of a real world object. The AR device may be a wearable device such as a helmet, a watch, a visor, or eyeglasses. The AR device enables a wearer or user to view the virtual object layers on a view of real world objects. The AR device may render an image of the real world objects in a display. In some example embodiments, the AR device renders a three-dimensional (3D) model of a virtual object in a transparent visor of a helmet. The absolute position or relative position of the AR device in space may be tracked using a visual inertial navigation (VIN) module in the AR device. In some embodiments, the VIN module generates a plurality of video frames with at least one camera of a wearable device and inertial measurement unit (IMU) data with at least one IMU sensor of the wearable device. The VIN module tracks features in the plurality of video frames for each camera, synchronizes and aligns the plurality of video frames for each camera with the IMU data. The VIN module then computes a dynamic state of the wearable device based on the synchronized plurality of video frames with the IMU data. The VIN module generates and positions AR content in a display of the wearable device based on the dynamic state of the wearable device.

In some example embodiments, at least one camera is calibrated for focal length, principal point, pixel aspect ratio, and lens distortion, and at least one IMU sensor is calibrated for noise, scale, and bias. This calibration may comprise factory calibration or user calibration or any combination thereof, such as using the techniques disclosed herein. The calibration information is applied to the plurality of video frames and the IMU data.

In some example embodiments, the IMU data includes a measurement of an angular rate of change and a measurement of linear acceleration. The features tracked by the VIN module may include stationary interest points and line features in the world, and the dynamic state of the wearable device may include position data, orientation data, GPS data, gyroscope data, accelerometer data, gyroscope bias and scale data, and accelerometer bias and scale data. In some example embodiments, the dynamic state is updated on every frame from at least one camera in real-time.

In some example embodiments, historical measurement data from at least one camera and IMU are accessed from the wearable device to refine real-time state estimates from the IMU sensor. A position of the AR content is adjusted in the display based on a latest dynamic state of the wearable device. The AR content may include three-dimensional graphical content. The display of the wearable device may include a transparent visor of a helmet. A location and size of a projected image of the three-dimensional graphical content may be adjusted in the transparent visor based on the dynamic state of the wearable device.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a block diagram illustrating an augmented reality (AR) device 100, in accordance with some example embodiments. The AR device 100 comprises a computing device configured to provide AR functionality, such as displaying virtual content superimposed over real-world content via a display. In some example embodiments, the AR device 100 comprises a wearable device, including, but not limited to a head-mounted display (HMD) device, a visor, or eyeglasses. Other types of AR devices, including, but not limited to, smart phones and tablet computers, are also within the scope of the present disclosure.

In some embodiments, AR device 100 comprises an HMD device, such as a helmet with a heads-up display. The HMD device is a device that provides a transparent display screen that presents content without requiring the user to look away from his or her usual viewpoint, such as with the user's head positioned up and looking forward, instead of angled down to look at a device. In some embodiments, the heads-up display device comprises an optical head-mounted display device, which may include, but is not limited to, a helmet mounted display device, glasses (e.g., Google Glass®), or other temporary or permanent form factors that can be either binocular or monocular. However, it is contemplated that other types of wearable devices are also within the scope of the present disclosure. In some embodiments, the AR device 100 comprises one or more image capture devices 102, one or more inertial sensors 104, a display system 106, memory 110, and one or more processors 108.

In some embodiments, the image capture device(s) 102 comprises a built-in camera or camcorder with which a user of the AR device 100 can use to capture image data of visual content in a real-world environment (e.g., a real-world physical object). The image data may comprise one or more still images or video. The image capture device(s) 102 can also be used to capture image data related to the positioning or orientation of at least one of the user's eyes, such as a gaze direction of the user's eyes (e.g., where the user is looking or the rotational position of the user's eyes relative to the user's head or some other point of reference). Other configurations of the image capture device(s) 102 are also within the scope of the present disclosure.

In some embodiments, the display system 106 is configured to display the image data captured by the image capture device 102. The display system 106 may comprise a display screen and one or more display modules configured to display image data on the display screen. Examples of display modules include, but are not limited to, projectors configured to project generated AR content on the display screen. In some embodiments, the display screen is transparent or semi-opaque so that the user of the AR device 100 can see through the display screen to the visual content in the real-world environment.

In some embodiments, the inertial sensor(s) 104 comprises an inertial measurement unit (IMU) sensor such as an accelerometer and/or a gyroscope with which a user of the wearable device 100 can track a position of the AR device 100 over time. For example, the inertial sensor 104 can measure an angular rate of change and linear acceleration of the AR device 100. The position of the AR device 100 can then be used to generate and display AR content in the display 106. The location of the AR content within the display screen may also be adjusted based on the dynamic state (e.g., position and orientation) of the AR device 100 in space over time relative to stationary objects sensed by the image capture device(s) 102.

In some embodiments, a visual inertial navigation (VIN) module 112 is stored in memory 110 or implemented as part of the hardware of the processor(s) 108, and is executable by the processor(s) 108. Although not shown, in some embodiments, the VIN module 112 may reside on a remote server and communicate with the AR device 100 via a network. The network may be any network that enables communication between or among machines, databases, and devices. Accordingly, the network may be a wired network, a wireless network (e.g., a mobile or cellular network), or any suitable combination thereof. The network may include one or more portions that constitute a private network, a public network (e.g., the Internet), or any suitable combination thereof.

In some example embodiments, the VIN module 112 computes the position and orientation of the AR device 100. In one embodiment, stationary points tracked over time, and the gyroscope and accelerometer data over time, the VIN module 112 solves for the position and orientation of the AR device 100. The stationary points may be used as constraints with the inertial information to compute the position and orientation of the AR device 100.

In some example embodiments, the VIN module 112 accesses the following data in order to compute the position and orientation of the AR device 100 in space over time:

Stationary world points $(x_i, y_i, z_i)$ where i represents the $i^{th}$ world point, Gyroscope measurements $(g_{xt}, g_{yt}, g_{zt})$, Accelerometer measurements $(a_{xt}, a_{yt}, a_{zt})$, Gyroscope bias $(bg_{xt}, bg_{yt}, bg_{zt})$ and Accelerometer bias $(ba_{xt}, ba_{yt}, ba_{zt})$ where t is time.

The VIN module 112 may generate a 3D map that consists of an (x,y,z) for each stationary point in the real physical world being tracked.

In some example embodiments, the AR device 100 may consist of one or more image capture devices 102 (e.g., camera) mounted on a rigid platform with one or more Inertial Navigation Unit (IMU) sensor. The image capture devices 102 can be mounted with non-overlapping (distributed aperture) or overlapping (stereo or more) fields-of-view.

In some example embodiments, the VIN module 112 includes an algorithm that combines inertial information from the inertial sensor(s) 104 and one or more image capture device(s) 102 in close proximity and coupled to a rigid platform or a rig. In one embodiment, a rig may consist of multiple cameras mounted on a rigid platform with an inertial navigation unit. A rig may thus have at least one inertial navigation unit and at least one camera.

In some example embodiments, at least one AR application 114 is stored in memory 110 or implemented as part of the hardware of the processor(s) 108, and is executable by the processor(s) 108. The AR application(s) 114 may provide the user 102 with an AR experience triggered by identified objects in a physical environment. The physical environment may include identifiable objects such as a 2D physical object (e.g., a picture), a 3D physical object (e.g., a factory machine), a location (e.g., at the bottom floor of a factory), or any references (e.g., perceived corners of walls or furniture) in the real world physical environment. The AR application(s) 114 may include computer vision recognition to determine corners, objects, lines, and letters.

In some example embodiments, a calibration module 116 is stored in memory 110 or implemented as part of the hardware of the processor(s) 108, and is executable by the processor(s) 108. The calibration module 116 is configured to perform intrinsic and extrinsic calibration procedures for the components of the AR device 100. These calibration procedures may comprise the calibration of any sensors, display surfaces, image capture devices, and projectors of the AR device 100 so that they are all synchronized, running off of the same clock, and knowing the attributes (e.g., location, positioning) of each other in order to facilitate their working together as a cohesive unit. In some example embodiments, the calibration module 116 also applies the calibration information to sensor data obtained by one or more sensors of the AR device 100.

In some example embodiments, the inertial sensor(s) 104 measures angular rate of change and linear acceleration, and the image capture device(s) 102 are used in a tracking system that tracks features in the video images. The image features could be corner or blob features extracted from the image. For example, first and second local patch differentials over the image could be used to find corner and blob features. The tracked image features are used to infer 3D geometry of the environment and are combined with the inertial information to estimate position and orientation of the AR device 100.

In some example embodiments, the 3D location of a tracked point is computed by triangulation that uses the observation of the 3D point in all cameras over time. The 3D estimate is improved as additional evidence or data is accumulated over time. The VIN module 112 can minimize the re-projection of the 3D points into the cameras over time, and the residual between the estimate and the IMU propagation estimate. The IMU propagation can solve the differential equations from an estimated rig state used as an initial starting point at time k and propagating the state to the next rig at k+1 using the gyroscope and accelerometer data between the rigs.

In some embodiments, the VIN module 112 is used to accurately localize the AR device 100 in space and simultaneously map the 3D geometry of the space around the AR device 100. The position and orientation of the AR device 100 can be used in an AR system by knowing precisely where the AR device 100 is in real-time and with low-latency to project a virtual world into a display system of the AR system or the display 106 of the AR device 100. The relation between the IMU sensor/camera and the display system can be known and calibrated off-line during a calibration process. In some example embodiments, the calibration process consists of observing a known 2D or 3D pattern in the world in all the cameras on the AR device 100 and IMU data over several frames. The pattern is detected in every frame and used to estimate the placement of the cameras and IMU on the AR device 100.

In order to present the sensor-derived data to the right place, the AR device 100 may need to know the viewpoint of a user through eye tracking. When the region of interest is identified by eye tracking, the HUD may want to render a preexisting model for the region and project overlay onto the real world or overlay location-specific information. Such overlay could have many applications, for example, change detection and augmented display. In order to render the model with the right scale, the distance from the user can be readily available from a 3D sensor or range sensor.

In some example embodiments, in order to achieve the goal of presenting the right information in the right place, various installed sensors and other components (e.g., image capture device(s) 102, inertial sensors 104, display screen, projectors, eye trackers) of the AR device 100 are calibrated, estimating both the intrinsic parameters of individual components (e.g., performance drift and noise, and lens distortion, field of view) and extrinsic parameters between the components (e.g., the relative geometric relation between sensors).

In some example embodiments, for any calibration, coordinate systems for each component or sensor are established and they are related to each other, as well as to the world coordinate system (e.g., the GPS coordinate system). In some example embodiments, right-hand side (RHS) coordinate systems are employed.

Figure 2:
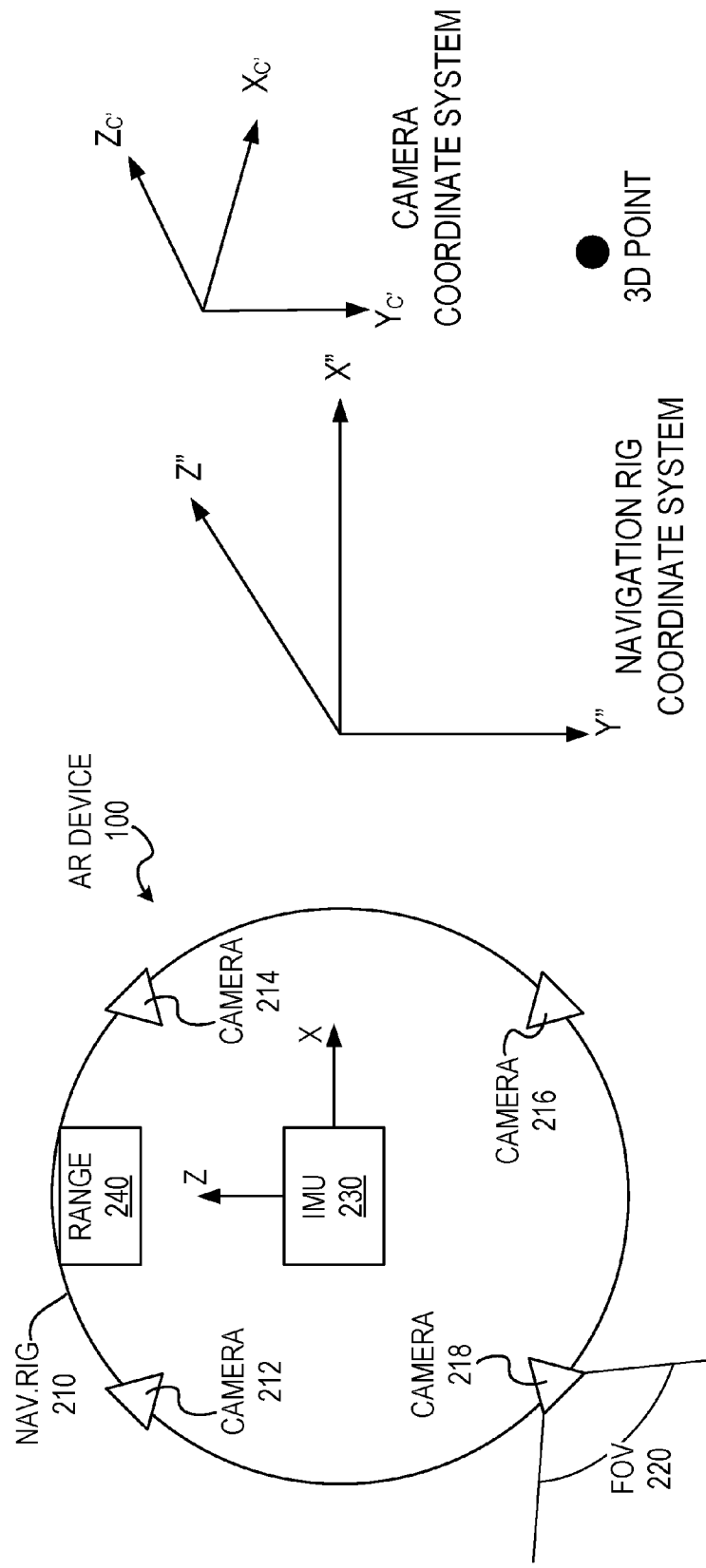
FIG. 2 illustrates coordinate systems of an AR device and its components, in accordance with some example embodiments.

FIG. 2 illustrates coordinate systems of the AR device 100 and its components, in accordance with some embodiments. The AR device 100 may comprise a navigation rig 210 with different sensors. While these sensors may be attached together rigidly via the navigation rig 210, often their relative geometries are unknown or accurate knowledge is not available. In addition, the fixed geometry can drift after a certain period of time. Therefore, the present disclosure provides techniques for calibrating the coordinate systems of each sensor against the navigation rig coordinate system.

FIG. 2 illustrates a configuration of sensors of the AR device 100, such as cameras 212, 214, 216, and 218, an IMU 230, and a range sensor 240 and the associated coordinate systems. Although the embodiment shown in FIG. 2 illustrates four cameras on the AR device in a configuration disposed around the navigation rig 210, it is contemplated that other numbers of cameras and other configurations may be employed within the scope of the present disclosure. In some example embodiments, the cameras 212, 214, 216, and 218 are disposed around the navigation rig 210 to capture overlapping fields of view (FOV) 220.

A component sensor can be described in the navigation rig coordinate system (CS) by its heading and position with respect to ($R_k$, $t_k$). In some example embodiments, $R_k$ is a rotation matrix (e.g., describing the orientation of the sensor) and $t_k$ is the position (e.g., a 3D translation vector describing the position of the camera center). The task of calibrating the CS of each sensor against the navigation rig CS is to obtain the accurate heading and position. When ($R_k$, $t_k$) is known or determined, transformation of a 3D point, represented in the navigation rig CS as $[X\ Y\ Z]^T$, to the sensor CS as $M_k$: $M_n = \text{inv}(R_k)*([X\ Y\ Z]^T - t_k)^T$ can be performed.

Figure 3:
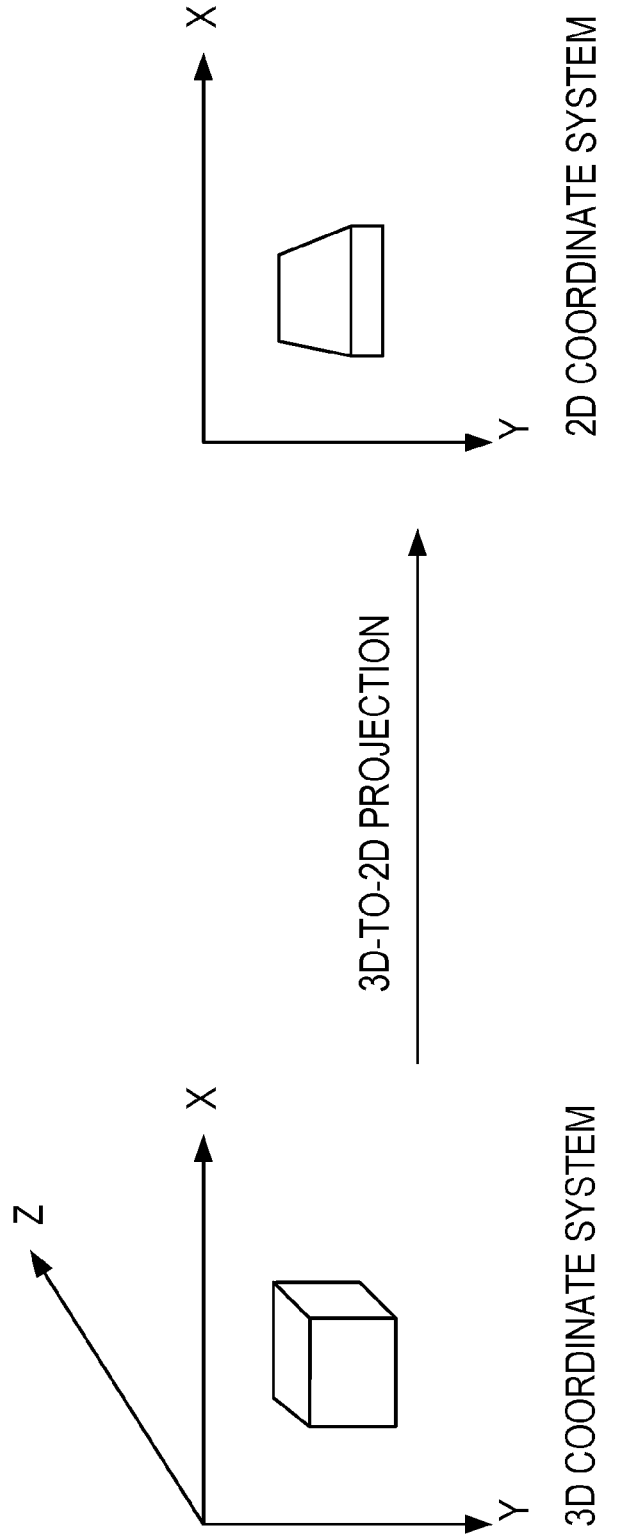
FIG. 3 illustrates a 3D to 2D perspective mapping, in accordance with some example embodiments.

For camera sensors, there can be an additional step. In some example embodiments, a 3D point is mapped to the image plane as 2D image pixels. This is a perspective projection and involves focal length, principle point (center of projection), aspect ratio between x and y, distortion parameter of the lens. FIG. 3 illustrates a 3D to 2D perspective mapping, in accordance with some embodiments. This is also called calibration of intrinsic parameters, while the above estimate of sensor heading and position is called extrinsic parameter calibration.

Referring back to FIG. 2, in some example embodiments, the following strategy is employed for calibrating four cameras 212, 214, 216, 218 and an IMU 230 on the navigation rig 210: Step I) individual calibration of intrinsic parameters for each camera and IMU; Step II) calibration of non-overlapping cameras; and Step III) joint calibration of the calibrated cameras and the IMU.

In some example embodiments, the calibration module 116 is configured to perform a corresponding intrinsic calibration procedure for each component in a plurality of components of the AR device 100 independently of any calibration procedure for any of the other components in the plurality of components (e.g., an intrinsic calibration procedure being performed on the IMU separately and independently of any intrinsic calibration procedure on any of the other components). In some example embodiments, each corresponding intrinsic calibration procedure comprises determining one or more corresponding intrinsic calibration parameters for the corresponding component based on a calculated difference between sensed data of the corresponding component and reference data (e.g., the difference between what the component senses and what is real; a measurement of the inaccuracy of the component).

In some example embodiments, the plurality of components comprises an inertial measurement unit (IMU), a range sensor, a camera for eye tracking, and at least one externally-facing camera for capturing visual content external of the head mounted display. In some example embodiments, the plurality of components further comprises a display surface and at least one projector configured to project AR content onto the display surface.

In some example embodiments, the calibration module 116 is configured to perform a plurality of extrinsic calibration procedures among the plurality of components (e.g., an extrinsic calibration procedure being performed on both the IMU and a camera). In some example embodiments, each extrinsic calibration procedure comprises determining one or more corresponding extrinsic calibration parameters based on a calculated difference between sensed data of one of the plurality of components and sensed data of another one of the plurality of components.

In some example embodiments, the calibration module 116 is configured to configure an AR function of the AR device 100, such as the AR application(s) 114, based on the determined intrinsic calibration parameters and the determined extrinsic calibration parameters. In some example embodiments, the configured AR function is configured to cause the display of virtual content on the display 106 of the AR device 100 using the determined intrinsic and extrinsic calibration parameters in conjunction with the plurality of components.

In some example embodiments, the AR application 114, and thus the AR function, of the AR device 100 resides on and is integrated into the AR device 100. Alternatively, the AR application 114, and thus the AR function, of the AR device 100 can reside on a computing device that is separate and remote from the AR device 100, such as on a remote server with which the AR device 100 communicates.

In some example embodiments, the calibration module 116 can reside on and be integrated into the AR device 100. Alternatively, the calibration module 116 can reside on a computing device that is separate and distinct from the AR device 100, yet capable of communicating with the AR device 100 so as to perform the calibration operations disclosed herein.

In some example embodiments, the configuring of the AR function comprises configuring the AR function to offset sensed data from the plurality of components based on the determined intrinsic and extrinsic calibration parameters.

In some example embodiments, configuring the AR function comprises configuring the AR device 100 based on the determined intrinsic calibration parameters and the determined extrinsic calibration parameters. In some example embodiments, configuring the AR device 100 comprises configuring one or more of its plurality of components.

In some example embodiments, configuring the AR function comprises configuring a computing device that is remote from the AR device 100 and communicates with the AR device 100 via wireless communication, where the remote computing device is configured to provide the AR function to the AR device 100.

Example embodiments of intrinsic calibration procedures and extrinsic calibration procedures that can be incorporated into the systems and methods of the present disclosure are discussed below. It is contemplated that other intrinsic calibration procedures and other extrinsic calibration procedures are also within the scope of the present disclosure.

Calibration of Individual Sensors—Intrinsic Parameters

In some example embodiments, intrinsic calibration of each component of the AR device 100 is performed.

A) Camera Calibration

For camera calibration (e.g., calibration of an externally-facing camera that captures visual content external of the AR device 100), a planar calibration target can be placed in front of the camera to be calibrated. A group (e.g., 10 to 15) of steady pictures of the calibration target is taken by the camera while moving it around to cover a full range of motion (mostly orientation). Software can be run to calculate the intrinsic parameters of the camera, such as focal length, aspect ratio, principle point, skew, and distortion parameters. The calibration target for camera calibration can be a flat calibration target with rectangular grid points or dotted patterns with precise known positions. However, other types of calibration targets are also within the scope of the present disclosure.

B) IMU Calibration—Accelerometer and Gyroscope

A MEMS IMU chip can be used, in accordance with example embodiments of the present disclosure, to integrate both the accelerometer and the gyroscope. The system can calibrate and compensate for errors so the performance can be significantly improved.

An important aspect of error compensation is to properly model the behavior of an IMU system while the model parameters can be obtained through adequate calibration. In general, the parameters that need calibration can include scale factor (sensor sensitivity), sensor bias, and axis misalignment, while the sensor noise can be properly modeled. For example, the following linear models can be used for MEMS gyroscope and accelerometer respectively:

$$\tilde{\omega} = (1+S_w)\omega + B_\omega + \varepsilon(\omega)$$

and $$\tilde{a} = (1+S_a)a + B_a + \varepsilon(a).$$

In addition, the system can calibrate the dependency of the gyroscope upon acceleration. As a result, the model for gyroscope can be modified as follows:

$$\tilde{\omega} = (1+S_w)\omega + B_\omega + b_a a + \varepsilon(\omega).$$

To make it more explicit for calibration considering misalignment of axes, the following matrix form for accelerometer can be obtained:

$$\begin{bmatrix} \tilde{a}_x \\ \tilde{a}_y \\ \tilde{a}_z \end{bmatrix} = \begin{bmatrix} (1+s_x) & m_{xy} & m_{xz} \\ m_{yx} & (1+s_y) & m_{yz} \\ m_{xz} & m_{yz} & (1+s_z) \end{bmatrix} \begin{bmatrix} a_x \\ a_y \\ a_z \end{bmatrix} + \begin{bmatrix} b_x \\ b_y \\ b_z \end{bmatrix}$$

For MMES IMU, the most significant error source can be the bias and time-dependent bias drift: $b=b_{cal}+b_{rand}(t)$. For example, the gyroscope has a random walk component that is difficult to compensate for even after laboratory calibration. Sensor fusion processing can be applied to carry out of on-line calibration. In addition, temperature introduced drifts on model parameters can be a big contribution factor.

C) Projector/Display Calibration

In some example embodiments, projector/display calibration is used to project an image to display a pattern with desired intensity and geometry. Both geometric and photometric correction can be applied to images for display. A factory calibration may be performed where a calibrated camera is placed in front of a camera calibration target to capture images.

First, a camera can be calibrated for the purpose of geometric distortion correction. The camera can then be used to capture displayed image of an ideal calibration target. By comparing these images (after applying geometric correction) with the ideal pattern, information on how to create an ideal displayed image by tweaking the ideal image before display can be obtained.

Calibration Among Sensors—Extrinsic Parameters

In some example embodiments, one component of the AR device 100 is be selected as the reference and its CS as the navigation rig CS, potentially with known rotation and translation. This way, the system only needs to calibrate all the other components against this reference component. Another calibration strategy that may be employed within the scope of the present disclosure is to group components into subsystem and then calibrate among subsystems.

A) Calibration of Non-Overlapping Cameras

Two example approaches for this calibration are provided herein. The key criterion here is to select one that is easy to carry out in practice without introducing unintended errors, for example, calibration targets unstable during operation.

The first approach is to use four identical calibration targets as previously described. In operation, the four calibration targets are fixed and the rig of cameras is moved around so that the relative pose of target-camera changes. Pictures of all four cameras are taken simultaneously The second approach is to use just one calibration target, but add a planar mirror. In operation, the mirror is moved around so the relative pose of target-mirror-camera changes. Pictures are taken of single camera or multiple cameras as long as all grid points are visible to all the cameras.

B) Calibration of Cameras and IMU

In operation, this calibration can be similar to calibration of the rig of non-overlapping cameras. The system may take additional readings from the IMU. In order to help reduce the IMU errors, the navigation rig can be attached to a rate table where rotation speed can be monitored and compensated. The rate table can be programmed to move to different canonical positions where video images can be captured by the cameras facing the camera calibration targets. To be more efficient, a robot can be used to replace the rate table.

C) Calibration of Range and Video

The goal of range-camera calibration is to obtain the 3D transformation (e.g., the relative pose of the camera coordinate system with respect to the coordinate system of the range sensor). With this calibration information, the system can transform the 3D points sensed by the range sensors and project them and overlay onto the images captured by the video camera.

In some example embodiments, the cameras and range are first calibrated, then the cameras and range sensors are calibrated by taking shots at a 3D target where 3D geometry varies for the patterns presented in the target D) Calibration of Thermal and Video In some example embodiments, in order to calibrate a video camera with a thermal (long-wave) camera, a calibration target is created that is visible in both visible and infra-red spectrum. One approach that can be used, in accordance with some example embodiments, is to create a stencil with desired patterns, for example, circles, and add heating elements in the back to help produce one or more heat-induced thermal images.

E) Calibration of Eye and Display

The goal of eye-display calibration is to obtain the transformation between eye and projector/display so that the AR device 100 can project/display image at the right place. This is particularly important for optical see-through displays. The system can project a 3D model into the display that can overlay the actual real-world scene. In some example embodiments, a factory calibration comprises a calibration for an average user using two eye cameras properly positioned behind the display of the HMD device. And user calibration is employed to adjust the factory calibration to suit each user better. In some example embodiments, user calibration for an individual user involves running on-line calibration procedure where geometrically widespread markers are displayed on the screen for the user to aim and focus.

The system may turn off the display to capture just the real-world image with lighting, such as lighting 416, and then the system can turn off the lighting and turn on the display to capture just the displayed image. The difference of these two images is due to the transformation between eye camera and display, and it can be used by the system to calibrate the eye to the display.

Calibration Between VIN IMU, Multiple Cameras, and Display Modules

In order to properly display AR content, it is important to sufficiently calibrate each component of the HMD device 100. Typically, calibration involves cameras and other sensors. However, display screens, display projectors and other display modules are not cameras. As a result, it can be a technical challenge to sufficiently calibrate certain sensors of the HMD device 100, such as a VIN IMU or a VIN camera, with a display screen or display projector of the HMD device 100. In some example embodiments, the present disclosure provides a technical solution to this problem by using one or more eye cameras to simulate the position of the eyes of a user of the HMD device 100, conceptualizing the display module as a virtual camera, and using multiple calibrations to bridge calibrations between components of the HMD device 100.

Figure 4:
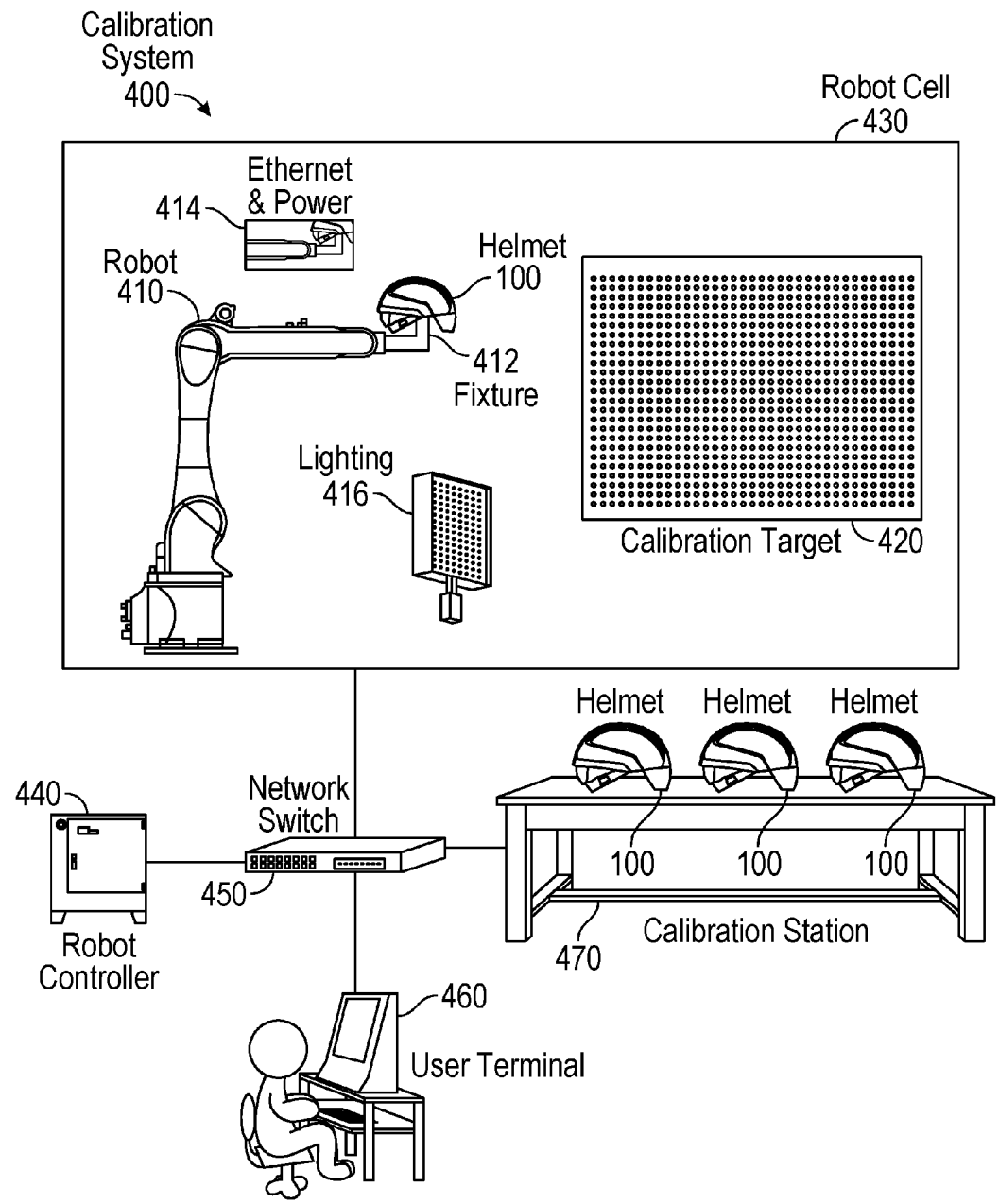
FIG. 4 is a diagram illustrating a calibration system, in accordance with some example embodiments.

FIG. 4 is a diagram illustrating a calibration system 400, in accordance with some example embodiments. In some example embodiments, the calibration system 400 comprises a robot 410, one or more calibration targets 420, and a calibration station 470.

The robot 410 is configured to provide motion volume for calibrating the camera, exciting the VIN IMU on a helmet 100, or other HMD device 100, attached to a moveable arm of the robot 410. In some example embodiments, the helmet 100 is secured to the robot 410 using a fixture 412. An Ethernet and power unit 414 can be connected to the helmet 100 in order to provide Ethernet capabilities and power to the helmet 100.

The calibration system 400 is configured to perform any combination of one or more of the calibration procedures disclosed above or below with respect to the calibration of the sensors or other components of the HMD device 100. In some example embodiments, the robot 410 moves the helmet 100 around the calibration target 420 while the components of the helmet 100 capture data to be used in determining calibration parameters. For example, a group (e.g., 10 to 15) of steady pictures of the calibration target 420 can be taken by the cameras (e.g., VIN camera, eye camera(s), and other cameras) and IMU data can be captured while the robot 410 moves the helmet 100 around to cover a full range of motion. Software (e.g., Matlab) can then be run to calculate the intrinsic and extrinsic calibration parameters. In some example embodiments, the calibration target 420 comprises a flat calibration target with rectangular grid points with precise positions that are known (e.g., accessed, received) by the calibration module 116 and used in calculating the calibration parameters. The calibration target 420 may comprise a plurality of circular patterns that can be detected by the sensors of the helmet 100 reliably and accurately. However, it is contemplated that other types of patterns and calibration targets 420 are also within the scope of the present disclosure.

In some example embodiments, the calibration system 400 comprises a software package that is installed on the helmet 100 itself or on a separate computing device. The software package is configured to receive the IMU data and video data captured by the components of the helmet 100 during the previously described data capture procedures, and to calculate the calibration parameters, which can then be used by the calibration module 116 to calibrate the helmet 100.

In some example embodiments, the calibration system 400 comprises a robot cell 430 that provides a safety system that protects a user, such as a technician, when the user needs to interact with the robot either manually or via a user terminal 460. The user terminal 460 may comprise a user interface configured to enable a user to log in to the calibration system 400 and launch the calibration procedures, such as the movement of the robot, data capture procedures, and calculation of calibration parameters. The computing machine may store data for multiple helmets, including raw data that is used for calibration. The computing machine may also be configured to perform off-peak hour upload of large amounts of data, such as calculated calibration parameters, to cloud storage for subsequent retrieval and use. In some example embodiments, the computing machine (e.g., a software application running on the computing machine) is configured to calculate calibration parameters based on the captured data. However, it is also contemplated that the helmet 100 may comprise a software application that calculates the calibration parameters based on the captured data.

In some example embodiments, the calibration system 400 comprises a robot controller 440 that is configured to act as the brain of the arm of the robot 410 and to communicate with the helmet 100 and the user terminal 460. In some example embodiments, the calibration system 400 comprises a network switch 450 configured to provide communication among the helmets 100 (including the helmet 100 attached to the robot 410, as well as the helmets coupled to a calibration station 470), the robot controller 440, and the user terminal 460.

In some example embodiments, the calibration station 470 is configured to hold multiple helmets 100 subsequent to the performance of the data capture operations. For example, after the components of the helmet 100 capture data during the data capture procedures using the robot 410, the helmet 100 can be removed from the robot 410 and connected to the calibration station 470, which can provide power and an Ethernet connection to each helmet 100. The calculation of calibration parameters can then be performed while the helmet 100 is connected to the calibration station 470, thereby allowing another helmet to be loaded onto the robot 410 for data capture and increasing the overall calibration throughput.

Although the example embodiments discussed above refer to the use of Ethernet, it is contemplated that other types of communication channels are also within the scope of the present disclosure, including, but not limited to, WiFi.

In some example embodiments, the calibration system 400 comprises lighting 416, such as light emitting diodes (LEDs) for power efficient diffused lighting. The lighting 416 is configured to provide light for the helmet 100 during the data capture operations. This lighting 416 is particularly beneficial when the helmet 100 comprises a visor that has a coating that only allows half of the photons to pass through.

Figure 5:
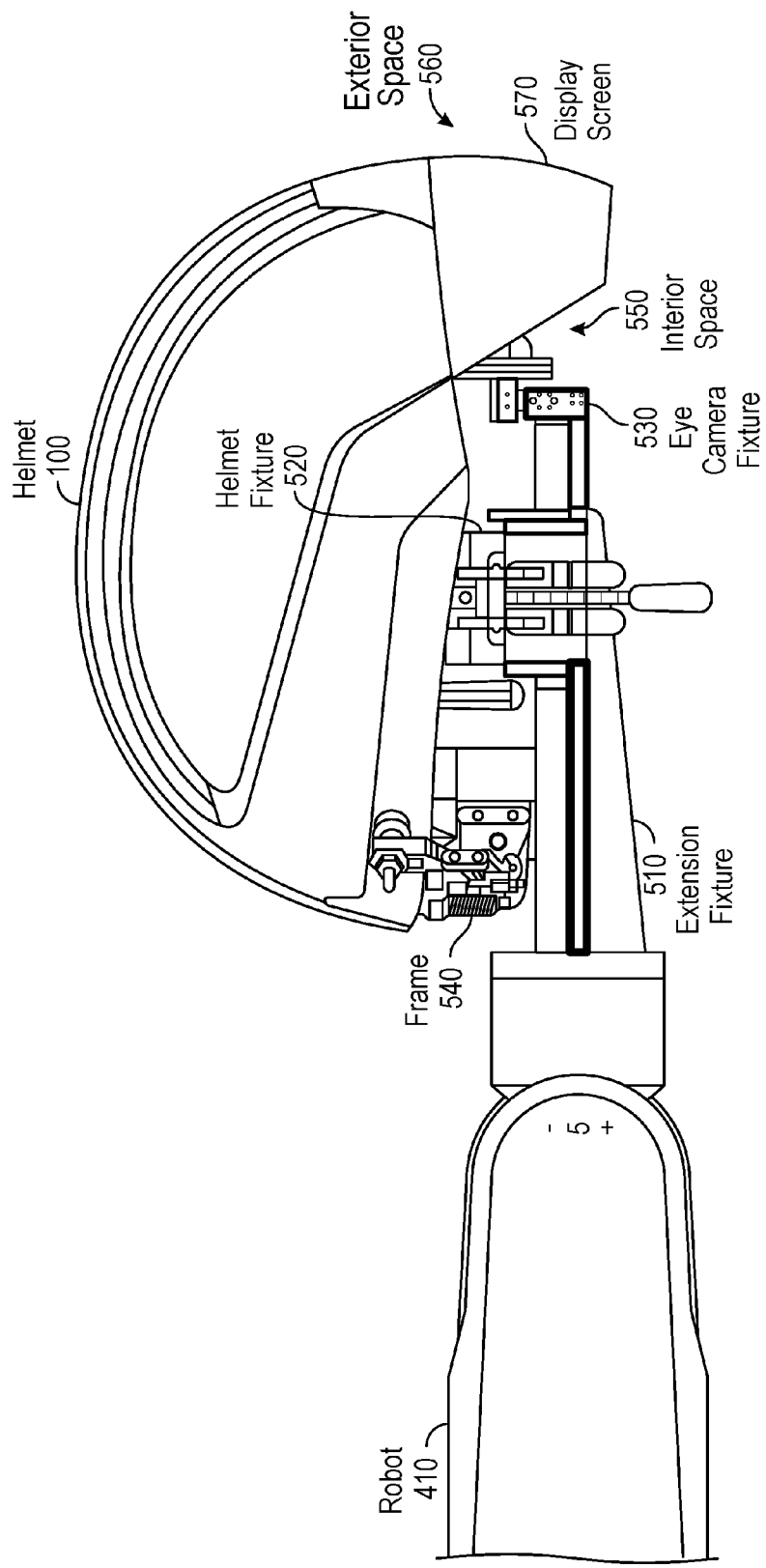
FIG. 5 is a diagram illustrating a calibration fixture attached to a calibration robot, in accordance with some example embodiments.

In some example embodiments, the fixture 412 is specially configured to be used for the calibration procedures disclosed herein. FIG. 5 is a diagram illustrating a calibration fixture, such as the fixture 412 in FIG. 4, attached to the robot 410, in accordance with some example embodiments. In some example embodiments, the calibration fixture comprises a set of fixtures, such as an extension fixture 510, a helmet fixture 420, and an eye camera fixture 530. The extension fixture 510 is configured to be connected to the arm of the robot 410, thereby extending the reach of the arm, such as to avoid collision. The helmet fixture 520 is configured to be connected to the extension fixture 510 and to releasably secure the helmet 100 to the extension fixture 510 and thus to the arm of the robot 410. In some example embodiments, the helmet fixture 520 is configured to releasably connect directly to the helmet 100, while, in other example embodiments, the helmet fixture 520 is configured to releasably connect to a frame 540 that is directly connected to the helmet 100. The eye camera fixture 530 is configured to releasably secure one or more eye cameras to the extension fixture 510, the helmet fixture 520, and/or to the frame 540.

It is contemplated that the releasable coupling between the fixtures and the other components disclosed with respect to FIG. 5 can be achieved using latches, screws, nuts, bolts, fasteners, or any other suitable releasable locking mechanisms.

The helmet 100 comprises a display screen 570, such as a visor, with an interior space 550 on one side of the display screen 570 and an exterior space 560 on the opposite side of the display screen from the interior space 550. Since the interior space 550 is where the eyes of a user of the helmet 100 would be positioned, the eye camera fixture 530 is configured to hold one or more eye cameras within the interior space 550 in order to enable the eye camera(s) to simulate the eyes of the user during the data capture operations of the calibration process. Accordingly, the eye camera fixture 530 is configured to hold the eye camera(s) in a position where the eye camera(s) is looking through the display screen to the calibration target 420 in the exterior space 560.

In some example embodiments, during a multi-camera calibration operation, all of the cameras of the helmet 100 are calibrated. This multi-camera calibration can include the eye cameras, the VIN camera, color cameras, thermal or near-infrared cameras, and/or depth cameras. Data capture using these cameras on the robot 410 can be implemented in order to capture data than can be used to calculate the intrinsic and extrinsic calibration parameters. The VIN camera and VIN IMU can also capture data during a VIN calibration procedure. The extrinsic poses can also be captured and stored along with time-synced images of the calibration target 420.

Figure 6:
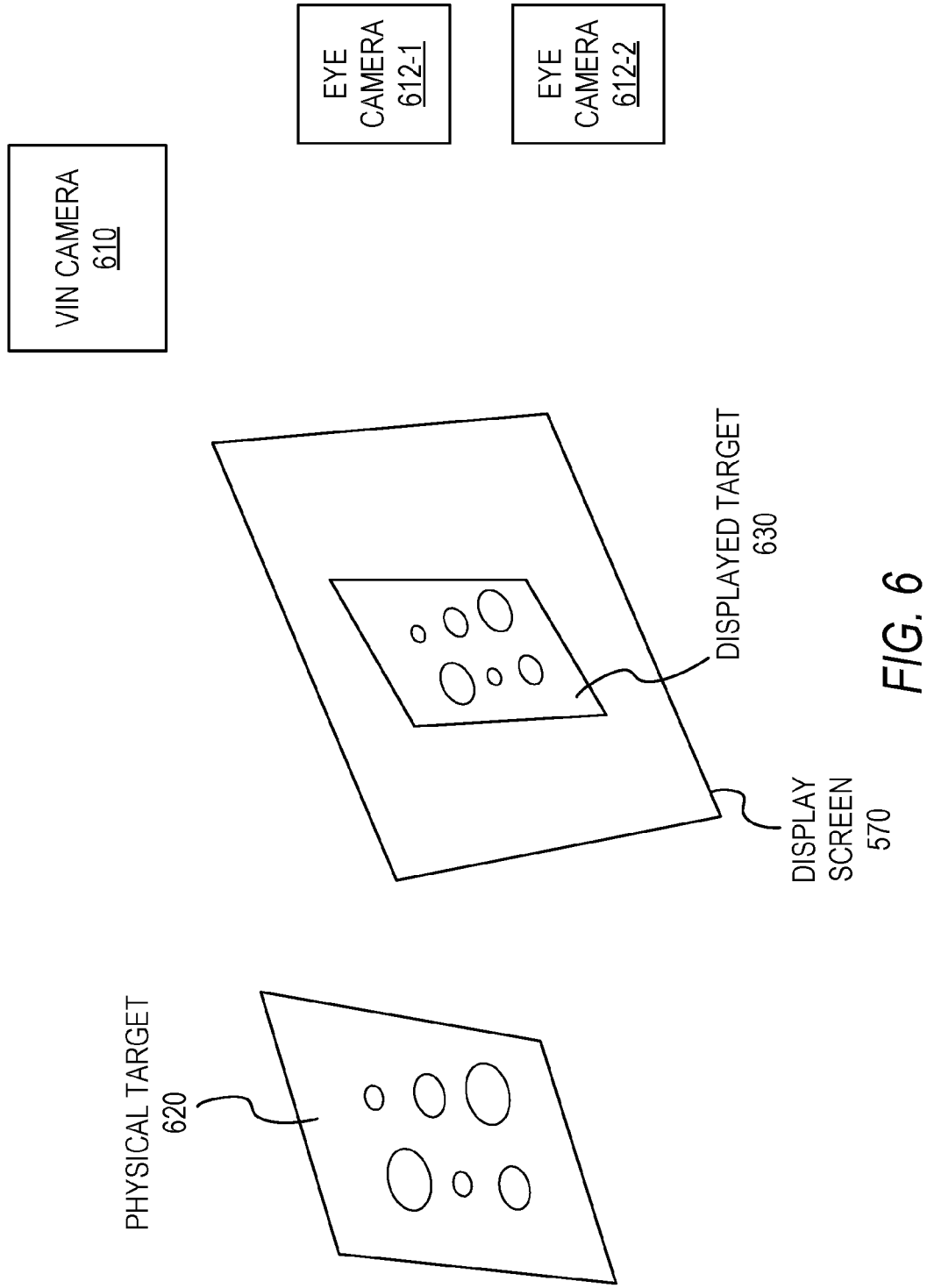
FIG. 6 is a conceptual diagram illustrating elements of calibrating one or more eye cameras to a display screen or display module, in accordance with some example embodiments.

FIG. 6 is a conceptual diagram illustrating elements of calibrating one or more eye cameras 612 to a display screen 570 or display module (e.g., a projector), in accordance with some example embodiments. Eye cameras 612-1 and 612-2 in FIG. 6 may be used to represent the average user's left eye and right eye. In some example embodiments, eye camera 612-1 and eye camera 612-2 are mounted, or otherwise secured, to the eye camera fixture 530 shown in FIG. 5, while VIN camera 610 is secured to the helmet 100. An eye-box alignment procedure may be performed, where the VIN camera 610 and eye cameras 612-1 and 612-2 capture images of a physical target 620. The physical target 620 may comprise the calibration target 420 shown in FIG. 4. However, it is contemplated that other physical targets 620 are also within the scope of the present disclosure. The eye cameras 612-1 and 612-2 view the physical target through the display screen 570 from the same perspective as would the average user's eyes, while the VIN camera 610 captures image data from a different perspective on the helmet 100. The AR application(s) 114 on the helmet 100 generate AR content based on the captured data from the VIN camera 610 and the eye cameras 612-1 and 612-2, and caused the generated AR content to be displayed on the display screen 570 using one or more display modules of the display system 106. In some example embodiments, the AR content generated based on the captured data from the VIN camera 610 and eye cameras 612-1 and 612-2 comprises a replication of the physical target 620 in the form of a displayed target 630. For example, if the physical target 620 is a pattern of circular shapes, then the displayed target 630 may also comprise a pattern of circular shapes. The eye cameras 612-1 and 612-2 then capture image data of the displayed target 630 overlayed on the display screen 570 over the view of the physical target 620. The calibration module 116 determines the calibration parameters based on the difference between the displayed target 630 and the physical target 620 in terms of their alignment with one another. The calibration module 116 determines the necessary adjustments that need to be made to bring the displayed target 630 into alignment with the physical target 620, and then determines the calibration parameters based on these adjustments. In some example embodiments, these adjustments are performed automatically by the calibration module 116 during a factory calibration process. In some example embodiments, these adjustments are made by a human user during an end user calibration process, where a human user provides input via a user interface of the helmet 100 to make the necessary adjustments to the displayed target 630 to bring it into alignment with the physical target 620.

In some example embodiments, a factory display calibration procedure comprises a display of a projected target 630. The calibration system 400 may run through all of the extrinsic poses and corresponding images from the multi-camera calibration step. For each extrinsic pose, the helmet may load in the extrinsic pose and project the target 620 based on its true-scale 3D model to the display. The eye camera(s) may capture these projected patterns and treat them as the images of the virtual cameras capturing the physical calibration target 620.

In some example embodiments, a user display calibration procedure comprises display of a projected target 630. Automatic pose recovery of the VIN camera with respect to the display may be performed. A user can look at a simple physical target 620 (e.g., a rectangle on a table, wall, floor, etc.) and a projected target 630 per eye dynamically. Automatic pose recovery of the VIN camera may be performed, with respect to the display. A simple displayed target 630 may be projected into the display screen 570 based on the pose of the display, with adjustments being made to scale, shift (e.g., up/down, left/right), and pitch and other angles. The user can confirm proper alignment, using his or her two eyes for depth perception.

Figure 7A:
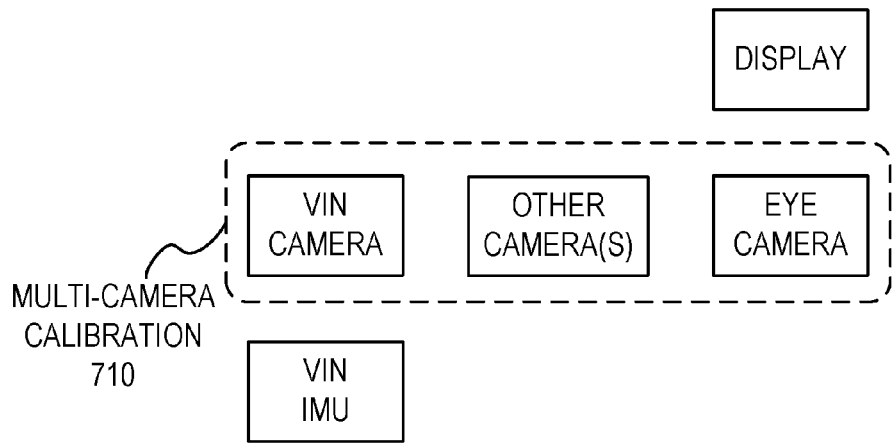
FIGS. 7A-7C are conceptual diagrams illustrating the calibration of a visual inertial navigation (VIN) inertial measurement unit (IMU) with a display module of an AR device, in accordance with some example embodiments.
Figure 7B:
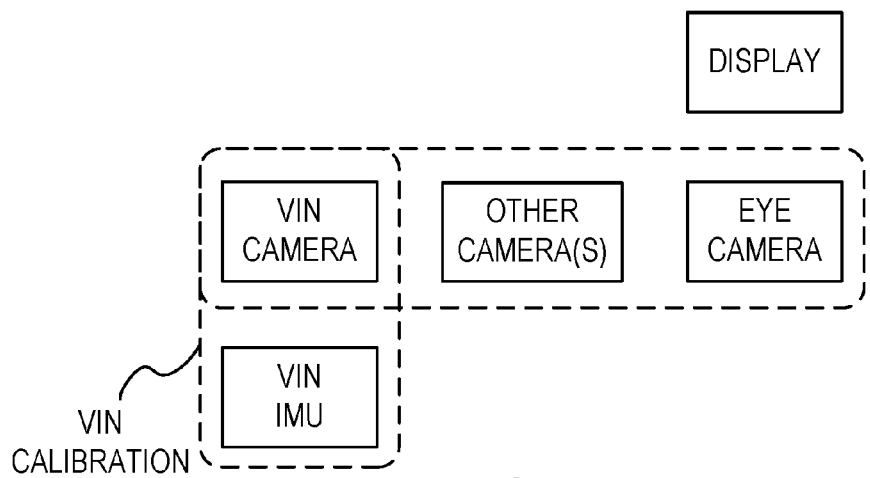
Figure 7C:
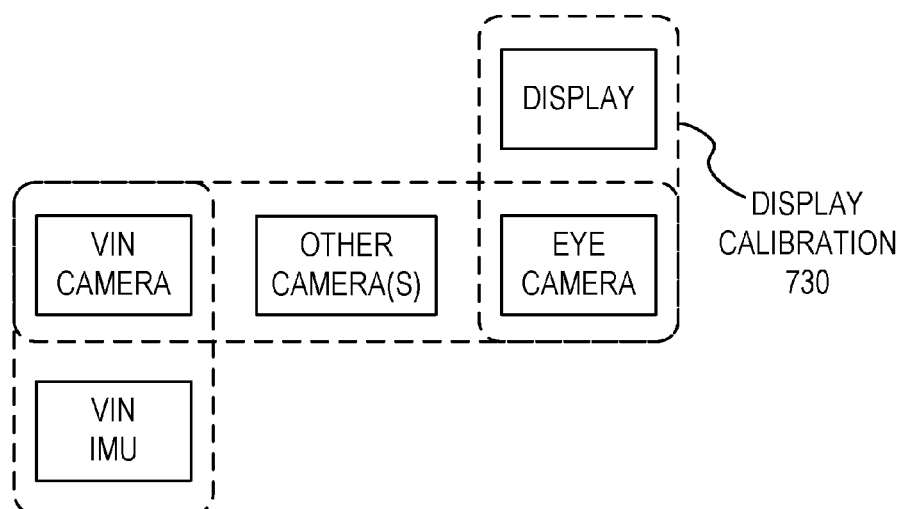

FIGS. 7A-7C are conceptual diagrams illustrating the calibration of a VIN IMU with a display module of an AR device, in accordance with some example embodiments. In FIG. 7A, a multi-camera calibration 710 is performed. In some example embodiments, this multi-camera calibration 710 comprises any combination of one or more of the multi-camera calibration operations discussed herein. In some example embodiments, the multi-camera calibration 710 includes calibrating a VIN camera (e.g., VIN camera 610) of an HMD device to at least one eye camera (e.g., VIN cameras 612-1 and 612-2) of the HMD device, calculating multi-camera calibration parameters. During the multi-camera calibration 710, the the eye camera(s) can simulate the positioning of at least one human eye within an interior space of the HMD device looking through a display screen of the HMD device to an exterior space of the HMD. In some example embodiments, the multi-camera calibration 710 also includes the calibration of one or more other cameras as well, such as calibrating all of the cameras on the HMD device with respect to one another.

In FIG. 7B, a VIN calibration is performed. In some example embodiments, this VIN calibration 720 comprises any combination of one or more of the VIN calibration operations discussed herein. In some example embodiments, the VIN calibration 720 includes calibrating the VIN IMU to the VIN camera, calculating VIN calibration parameters.

In FIG. 7C, a display calibration 730 is performed. In some example embodiments, this display calibration 730 comprises any combination of one or more of the display calibration operations discussed herein. In some example embodiments, the VIN calibration 720 includes calibrating the eye camera(s) to a display screen or a display module of the HMD device, calculating display calibration parameters.

As can be seen with the progressive connection of the corresponding areas representing the different calibrations 710, 720, and 730, these different calibrations 710, 720, and 730 can be used by the calibration module 116 to enable any component of the HMD device to be calibrated with any other component of the HMD device, which is particularly useful in calibrating the VIN IMU with the display screen or display module, since the display screen and the display module do not comprise cameras. Since calibration is typically performed with respect to cameras, one technique of the present disclosure is to treat the display screen or the display module of the HMD device as a virtual camera for the purposes of its calibration with other components of the HMD device, such as its calibration with the VIN IMU and the VIN camera.

Although some of the example embodiments disclosed herein involve a VIN calibration step, such as the calibration of the VIN IMU with the VIN camera, it is contemplated that, in some example embodiments, the calibration techniques of the present disclosure can also be used without the calibration of the VIN IMU and the VIN camera. In some example embodiments, the calibration techniques of the present disclosure can be applied to an HMD device and any number of cameras of the HMD device, as well as to any type of cameras of the HMD device, including, but not limited to, one or more color cameras, one or more depth sensors (e.g., a depth sensor based on a pair of stereo cameras), one or more thermal cameras, and one or more eye cameras.

Figure 8:
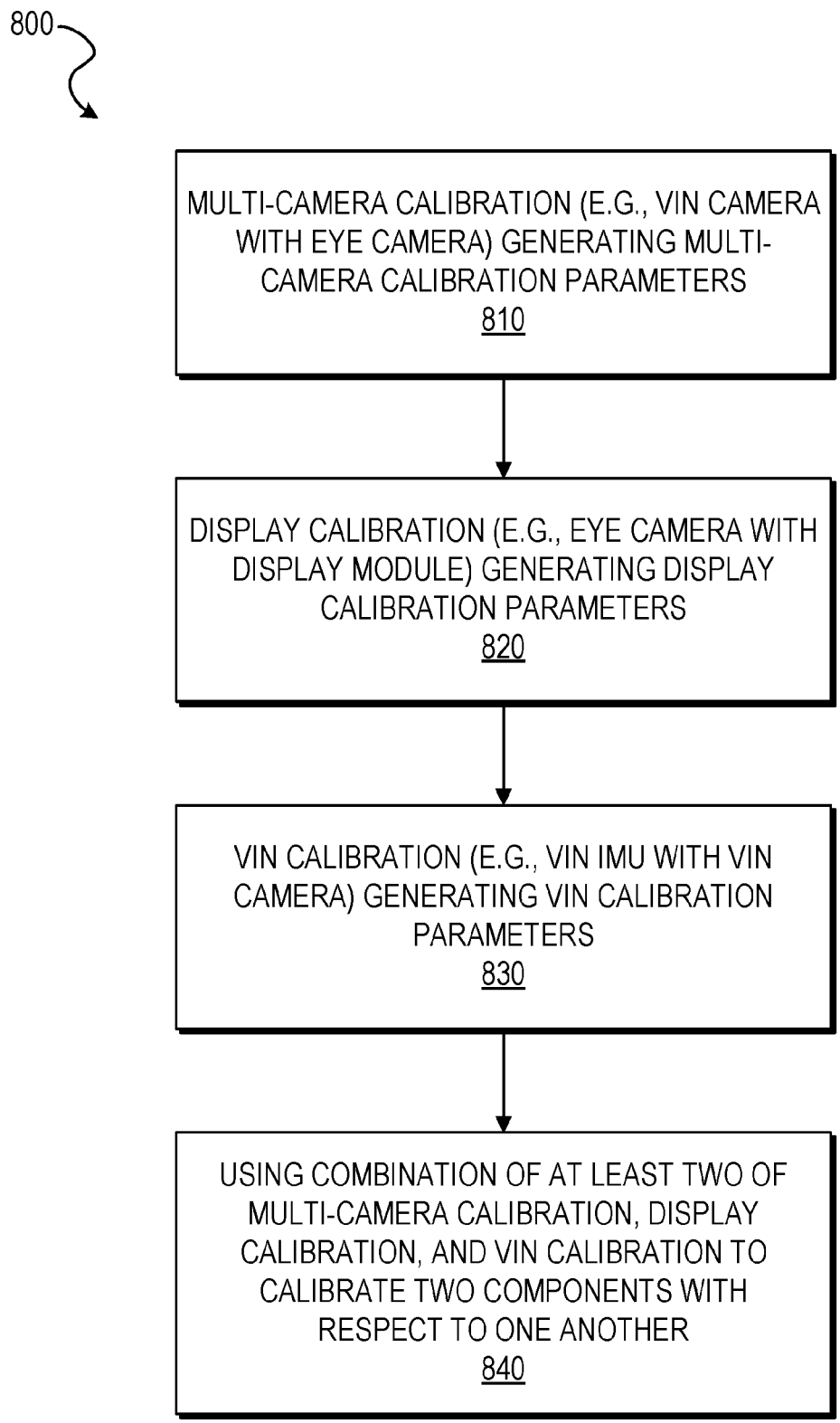
FIG. 8 is a flowchart illustrating a method of calibrating an augmented reality (AR) device, in accordance with some example embodiments.

FIG. 8 is a flowchart illustrating a method of calibrating an AR device, in accordance with some example embodiments. Method 800 can be performed by processing logic that can comprise hardware (e.g., circuitry, dedicated logic, programmable logic, microcode, etc.), software (e.g., instructions run on a processing device), or a combination thereof. In one example embodiment, the method 800 is performed by the calibration system 400 of FIG. 4, or any combination of one or more of its components, as described above.

At operation 810, the calibration system 400 calibrates a VIN camera of an HMD device to or with at least one eye camera of the HMD device, with the eye camera(s) simulating the positioning of at least one human eye within an interior space of the HMD device looking through a display screen of the HMD device to an exterior space of the HMD. In some example embodiments, the VIN camera is configured to be used with an IMU of the HMD device to determine a VIN state, and the calibrating of the VIN camera to the eye camera(s) comprises calculating multi-camera calibration parameters. In some example embodiments, the HMD device comprises a helmet.

In some example embodiments, the calibrating of the VIN camera to or with the eye camera(s) comprises receiving VIN data and eye camera data, with the VIN data having been captured by the VIN camera and the eye camera data having been captured by the eye camera(s) while the VIN camera, the at least one eye camera, and the HMD device were physically coupled to a calibration robot, and the calculating of the multi-camera calibration parameters comprises calculating the multi-camera calibration parameters using the VIN data and the eye camera data while the HMD device is not physically coupled to the calibration robot.

In some example embodiments, the display screen is transparent. In some example embodiments, the display module comprises at least one projector configured to project the AR content onto the display screen.

At operation 820, the calibration system 400 calibrates the eye camera(s) to or with a display module of the HMD, with the display module being configured to display AR content on the display screen. In some example embodiments, the calibrating of the eye camera(s) to or with the display module comprises calculating display calibration parameters.

In some example embodiments, the calibrating of the eye camera(s) to or with the display module comprises receiving eye camera data, with the eye camera data having been captured by the at least one eye camera while the VIN camera, the eye camera(s), and the HMD device were physically coupled to a calibration robot, and the calculating of the display calibration parameters comprises calculating the display calibration parameters using the eye camera data while the HMD device is not physically coupled to the calibration robot.

At operation 830, the calibration system 400 calibrates the IMU to or with the VIN camera. In some example embodiments, the calibrating of the IMU to or with the VIN camera comprises calculating VIN calibration parameters.

In some example embodiments, the calibrating of the IMU to or with the VIN camera comprises receiving VIN data, with the VIN data having been captured by the VIN camera while the VIN camera and the HMD device were physically coupled to a calibration robot. In some example embodiments, the calculating of the VIN calibration parameters comprises calculating the VIN calibration parameters using the VIN data while the HMD device is not coupled to the calibration robot.

At operation 840, the calibration system 840 calibrates the IMU to or with the display module using the multi-camera calibration parameters, the display calibration parameters, and the VIN calibration parameters.

In some example embodiments, the calibration system 400 performs a loop closure process using the HMD device using the multi-camera calibration parameters, the display calibration parameters, and the VIN calibration parameters. In some example embodiments, the calibration system 400 validates the multi-camera calibration parameters, the display calibration parameters, and the VIN calibration parameters based on the loop closure process.

It is contemplated that any of the other features described within the present disclosure can be incorporated into method 800.

In some example embodiments, a loop closure operation is performed to check the performance of the VIN IMU and VIN camera.

In some example embodiments, the calculation of one or more of the calibration parameters is performed subsequent to the HMD device 100 being removed from the robot 410. In some example embodiments, multiple fixtures may be employed to secure the HMD device 100 to and remove the HMD device 100 from the robot 410 so that the display calibration using the eye cameras can be performed off of the robot 410, while the eye cameras are still secured to the helmet via the eye camera fixture. Such example embodiments provide an efficient process and result in high throughput. One example of such an embodiment is as follows:

1. Fix helmet 100 onto helmet fixture 520 and then onto eye camera fixture 530, and then load onto robot 410 and extension fixture 510.
2. Log onto helmet 100 with known IP address from user terminal 460, and then launch data capture process using robot 410.
3. Using robot 410, perform data capture process for calibration.
    a) Run multi-camera calibration data capture.
    b) Run VIN calibration data capture.
4. Off-load helmet 100 along with eye camera fixture 530 and helmet fixture 520 to calibration station 470.
5. On calibration station 470, perform calibration/rendering calculations.
    a) Log onto calibration application running on helmet 100, and launch calculation from user terminal 460.
    b) Perform multi-camera calibration calculations.
    c) Perform eyebox alignment, rendering, and calculation.
    d) Perform rendering and data capture for display calibration.
    e) Perform display calibration calculation.
    f) Perform VIN camera calibration calculation.
    g) Perform quality assurance calculation process (e.g., loop closure procedure).

h) Save results (e.g., calibration parameters) onto helmet 100 (e.g., in JSON format) and back up results to cloud storage; save captured data to computing device of user terminal 460 via Ethernet.

6. The user terminal 460 copies the captured data and/or the calculated data (e.g., calibration parameters) to cloud storage at predetermined time periods (e.g., at 5 pm each day).

In some example embodiments, the calculation of one or more of the calibration parameters is performed while the HMD device 100 is secured to the robot 410. In some example embodiments, a single fixture may be employed to secure the HMD device 100 to and remove the HMD device 100 from the robot 410, thereby maximizing the stability consistency of positioning between the eye cameras and the display screen and display module, since the use of multiple fixtures to secure the helmet 100 to the robot 410 can result in the unintended and undesirable adjustment of components. Every mechanical coupling that needs to be made can add to such unintended and undesirable adjustments. The use of a single fixture and the calculation of one or more of the calibration parameters while the HMD device 100 is secured to the robot 410 improves the stability and accuracy of the process. One example of such an embodiment is as follows:

1. Fix helmet 100 onto helmet fixture 520, and then load helmet fixture 520 with the helmet 100 onto the extension fixture 510 extending from the robot 410.
2. Log onto calibration application running on helmet 100 with known IP address from user terminal 460, and then launch data capture process using robot 410.

3. Using robot 410, perform data capture and rendering process for calibration.
   a) Run multi-camera calibration data capture process.
   b) Perform multi-camera calibration calculations.
   c) Perform eyebox alignment process, rendering, and calculation.
   d) Perform rendering and data capture process for display calibration.
   e) Run VIN calibration data capture process.
4. Off load helmet 100 to calibration station 470.
5. On calibration station 470, perform calibration/rendering calculations.
   a) Log onto calibration application running on helmet 100, and launch calculation of calibration parameters from user terminal 460.
   b) Perform display calibration calculation.
   c) Perform VIN camera calibration calculation.
   d) Perform quality assurance calculation process (e.g., loop closure procedure).
   e) Save results (e.g., calibration parameters) onto helmet 100 (e.g., in JSON format) and back up results to cloud storage; save captured data to user terminal 460 via Ethernet.
6. The user terminal 460 copies the captured data and/or the calculated data (e.g., calibration parameters) to cloud storage at predetermined time periods (e.g., at 5 pm each day).

It is contemplated that other workflows of calibration operations are also within the scope of the present disclosure.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
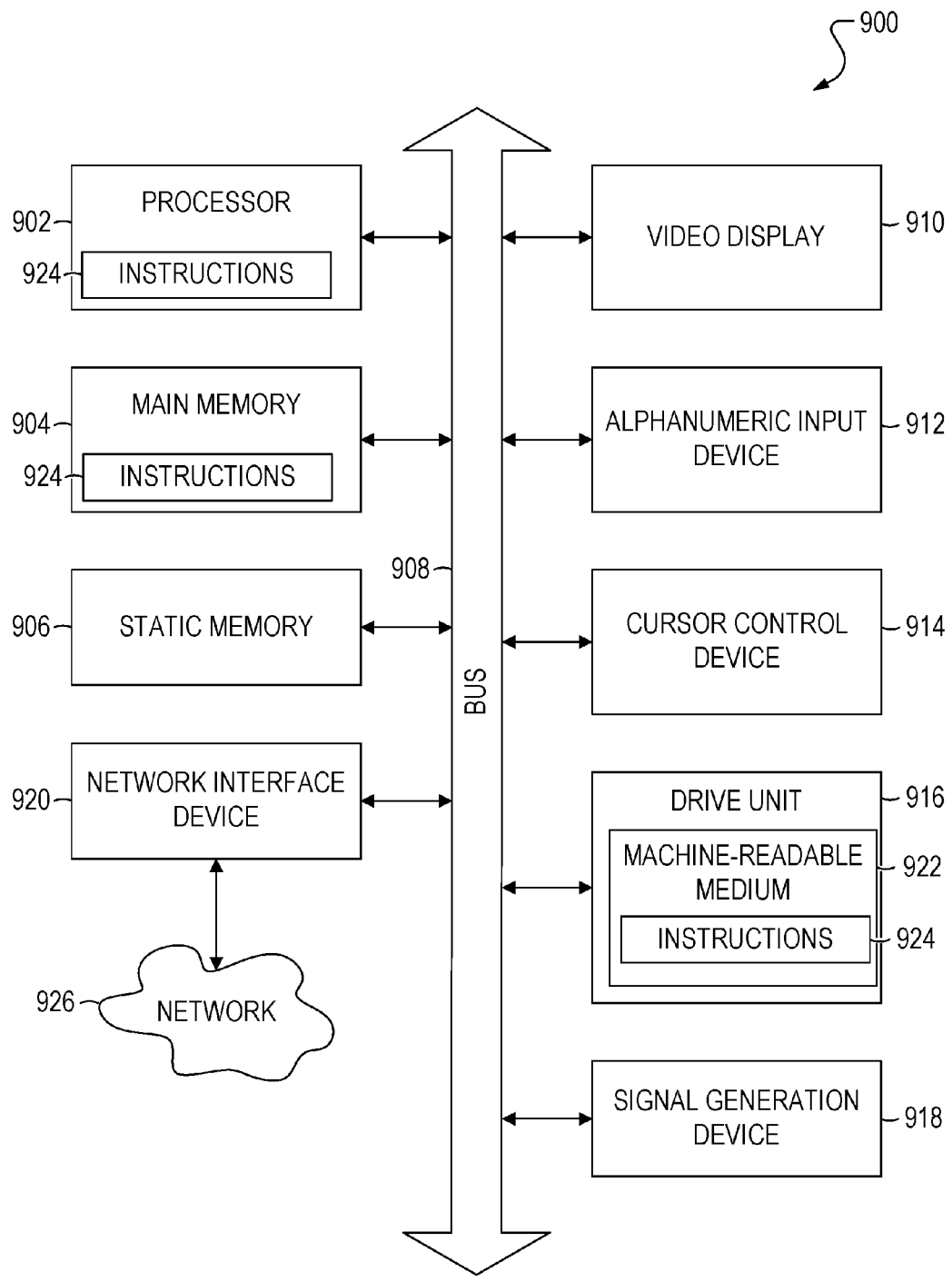
FIG. 9 is a block diagram of an example computer system on which methodologies described herein may be executed, in accordance with some example embodiments.

FIG. 9 is a block diagram of a machine in the example form of a computer system 900 within which instructions 924 for causing the machine to perform any one or more of the methodologies discussed herein may be executed, in accordance with an example embodiment. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a smartphone, a tablet computer, a set-top box (STB), a Personal Digital Assistant (PDA), a web appliance, a network router, switch or bridge, a head-mounted display or other wearable device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910. The computer system 900 may also include an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   calibrating multiple cameras of a head mounted display (HMD) device with respect to one another, the multiple cameras comprising at least one eye camera, the at least one eye camera simulating the positioning of at least one human eye within an interior space of the HMD device looking through a display screen of the HMD device to an exterior space of the HMD, the multiple cameras further comprising a visual inertial navigation (VIN) camera, the VIN camera being configured to be used with an inertial measurement unit (IMU) of the HMD device to determine a VIN state, the calibrating of the multiple cameras comprising calculating multi-camera calibration parameters;
   calibrating the at least one eye camera with a display module of the HMD, the display module being configured to display AR content on the display screen, the calibrating of the at least one eye camera with the display module comprising calculating display calibration parameters;
   calibrating the IMU to the VIN camera, the calibrating of the IMU to the VIN camera comprising calculating VIN calibration parameters;
   calibrating, by a machine having a memory and at least one processor, one of a plurality of components of the HMD device with another one of the plurality of components of the HMD device using the multi-camera calibration parameters and the display calibration parameters, the plurality of components comprising the display module and at least one of the multiple cameras, the calibrating of the one of a plurality of components of the HMD device with another one of the plurality of components of the HMD device comprising calibrating the IMU to the display module using the multi-camera calibration parameters, the display calibration parameters, and the VIN calibration parameters;
   performing a loop closure process using the HMD device using the VIN calibration parameters; and
   validating the VIN calibration parameters based on the loop closure process and ground-truth data provided by a trajectory of a calibration robot.

2. The computer-implemented method of claim 1, wherein the multiple cameras comprise at least one additional camera other than the VIN camera and the at least one eye camera.

3. The computer-implemented method of claim 1, wherein the calibrating of the multiple cameras comprises receiving VIN data and eye camera data, the VIN data having been captured by the VIN camera and the eye camera data having been captured by the at least one eye camera while the VIN camera, the at least one eye camera, and the HMD device were physically coupled to a calibration robot, and the calculating of the multi-camera calibration parameters comprises calculating the multi-camera calibration parameters using the VIN data and the eye camera data while the HMD device is not physically coupled to the calibration robot.

4. The computer-implemented method of claim 1, wherein the calibrating of the at least one eye camera to the display module comprises receiving eye camera data, the eye camera data having been captured by the at least one eye camera while the VIN camera, the at least one eye camera, and the HMD device were physically coupled to a calibration robot, and the calculating of the display calibration parameters comprises calculating the display calibration parameters using the eye camera data while the HMD device is not physically coupled to the calibration robot.

5. The computer-implemented method of claim 1, wherein the calibrating of the IMU to the VIN camera comprises receiving VIN data, the VIN data having been captured by the VIN camera while the VIN camera and the HMD device were physically coupled to a calibration robot, the calculating of the VIN calibration parameters comprising calculating the VIN calibration parameters using the VIN data while the HMD device is not coupled to the calibration robot.

6. The computer-implemented method of claim 1, wherein the HMD device comprises a helmet.

7. The computer-implemented method of claim 1, wherein the display screen is transparent.

8. The computer-implemented method of claim 1, wherein the display module comprises at least one projector configured to project the AR content onto the display screen.

9. A system comprising:
at least one processor; and
a non-transitory computer-readable medium storing executable instructions that, when executed, cause the at least one processor to perform operations comprising:
calibrating a visual inertial navigation (VIN) camera of a head mounted display (HMD) device to at least one eye camera of the HMD device, the at least one eye camera simulating the positioning of at least one human eye within an interior space of the HMD device looking through a display screen of the HMD device to an exterior space of the HMD, the VIN camera being configured to be used with an inertial measurement unit (IMU) of the HMD device to determine a VIN state, the calibrating of the VIN camera to the at least one eye camera comprising calculating multi-camera calibration parameters;
calibrating the at least one eye camera to a display module of the HMD, the display module being configured to display AR content on the display screen, the calibrating of the at least one eye camera to the display module comprising calculating display calibration parameters;
calibrating the IMU to the VIN camera, the calibrating of the IMU to the VIN camera comprising calculating VIN calibration parameters;
calibrating the IMU to the display module using the multi-camera calibration parameters, the display calibration parameters, and the VIN calibration parameters;
performing a loop closure process using the HMD device using the VIN calibration parameters; and
validating the VIN calibration parameters based on the loop closure process and ground-truth data provided by a trajectory of a calibration robot.

10. The system of claim 9, wherein the HMD device comprises a helmet.

11. The system of claim 9, wherein the calibrating of the VIN camera to the at least one eye camera comprises receiving VIN data and eye camera data, the VIN data having been captured by the VIN camera and the eye camera data having been captured by the at least one eye camera while the VIN camera, the at least one eye camera, and the HMD device were physically coupled to a calibration robot, and the calculating of the multi-camera calibration parameters comprises calculating the multi-camera calibration parameters using the VIN data and the eye camera data while the HMD device is not physically coupled to the calibration robot.

12. The system of claim 9, wherein the calibrating of the at least one eye camera to the display module comprises receiving eye camera data, the eye camera data having been captured by the at least one eye camera while the VIN camera, the at least one eye camera, and the HMD device were physically coupled to a calibration robot, and the calculating of the display calibration parameters comprises calculating the display calibration parameters using the eye camera data while the HMD device is not physically coupled to the calibration robot.

13. The system of claim 9, wherein the calibrating of the IMU to the VIN camera comprises receiving VIN data, the VIN data having been captured by the VIN camera while the VIN camera and the HMD device were physically coupled to a calibration robot, the calculating of the VIN calibration parameters comprising calculating the VIN calibration parameters using the VIN data while the HMD device is not coupled to the calibration robot.

14. The system of claim 9, wherein the display screen is transparent.

15. The system of claim 9, wherein the display module comprises at least one projector configured to project the AR content onto the display screen.

16. A non-transitory machine-readable storage medium storing a set of instructions that, when executed by at least one processor, causes the at least one processor to perform operations comprising:
calibrating a visual inertial navigation (VIN) camera of a head mounted display (HMD) device to at least one eye camera of the HMD device, the at least one eye camera simulating the positioning of at least one human eye within an interior space of the HMD device looking through a display screen of the HMD device to an exterior space of the HMD, the VIN camera being configured to be used with an inertial measurement unit (IMU) of the HMD device to determine a VIN state, the calibrating of the VIN camera to the at least one eye camera comprising calculating multi-camera calibration parameters;
calibrating the at least one eye camera to a display module of the HMD, the display module being configured to display AR content on the display screen, the calibrating of the at least one eye camera to the display module comprising calculating display calibration parameters;
calibrating the IMU to the VIN camera, the calibrating of the IMU to the VIN camera comprising calculating VIN calibration parameters;
calibrating the IMU to the display module using the multi-camera calibration parameters, the display calibration parameters, and the VIN calibration parameters;
performing a loop closure process using the HMD device using the VIN calibration parameters; and
validating the VIN calibration parameters based on the loop closure process and ground-truth data provided by a trajectory of a calibration robot.

17. The non-transitory machine-readable storage medium of claim 16, wherein the calibrating of the VIN camera to the at least one eye camera comprises receiving VIN data and eye camera data, the VIN data having been captured by the VIN camera and the eye camera data having been captured by the at least one eye camera while the VIN camera, the at least one eye camera, and the HMD device were physically coupled to a calibration robot, and the calculating of the multi-camera calibration parameters comprises calculating the multi-camera calibration parameters using the VIN data and the eye camera data while the HMD device is not physically coupled to the calibration robot.

* * * * *